May 23, 1933. A. B. MODINE 1,910,175
HEATING DEVICE
Original Filed June 10, 1929
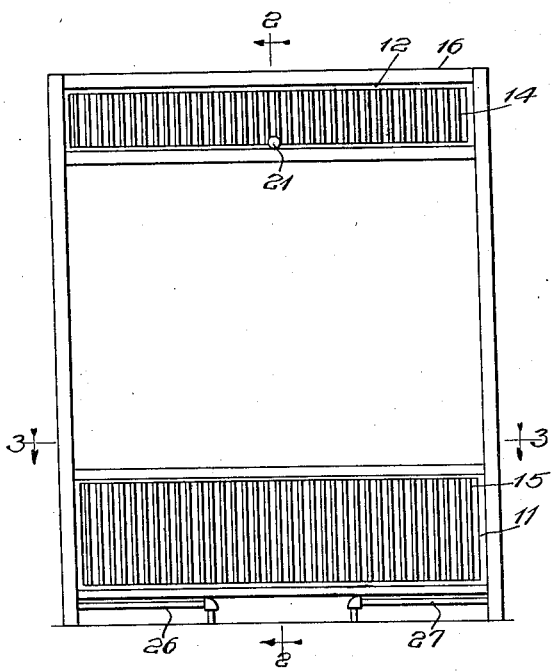
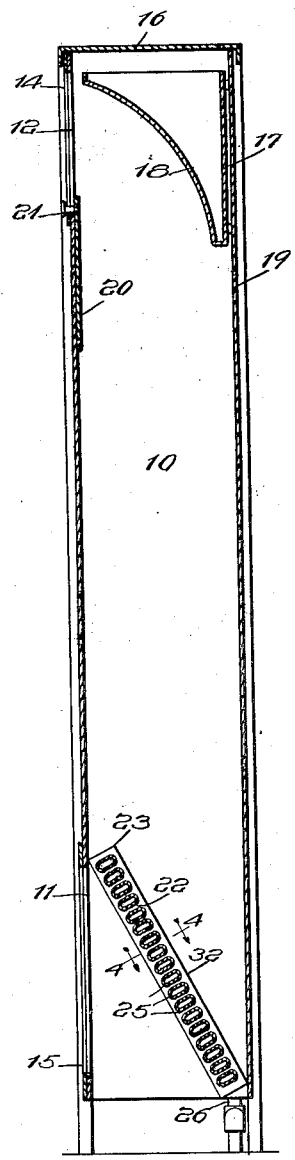
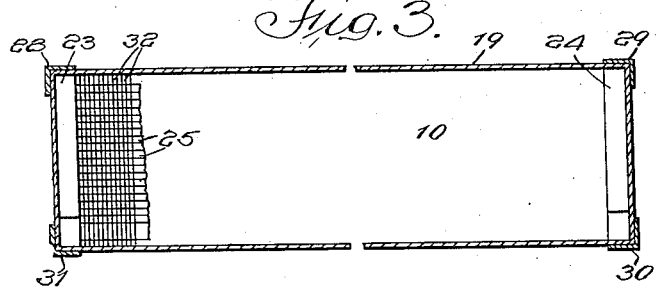
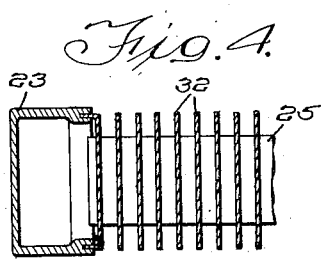
Inventor:
Arthur B. Modine
Witness:
William P. Kilroy
By Hill & Hill
Attys.

Patented May 23, 1933

1,910,175

UNITED STATES PATENT OFFICE

ARTHUR B. MODINE, OF RACINE, WISCONSIN, ASSIGNOR TO MODINE MANUFACTURING COMPANY, OF RACINE, WISCONSIN, A CORPORATION OF WISCONSIN

HEATING DEVICE

Original application filed June 10, 1929, Serial No. 369,897. Divided and this application filed May 20, 1931. Serial No. 538,720.

My invention relates to heating devices and has among its objects the production of devices of the kind described that comprise cabinets which are neat and attractive in appearance, convenient, durable and satisfactory for use wherever found applicable.

Another object of the invention is the provision of a combination cabinet and heating device constructed to induce circulation of air through the cabinet.

The invention has as a further object the provision of a heating device having a cabinet having an opening provided adjacent the upper and lower portion thereof and having a heating unit positioned in the cabinet so as to induce a flow of air through the cabinet and having humidifying means mounted within the cabinet and means serving to deflect a current of air outwardly through the upper opening.

The invention has as an object the provision of means such as that just referred to having means for controlling the circulation of air through the cabinet.

Another object of the invention is to provide a heating unit having tubes which are relatively flat in cross section and which are inclined to the vertical so as to induce circulation of air into and through the cabinet, the cabinet having humidifying means provided therein, the latter being constructed to induce flow of air outwardly of the cabinet.

The invention has these and other objects, all of which will be explained in detail and more readily understood when read in conjunction with the accompanying drawing which illustrates one embodiment of which the invention is susceptible, it being manifest that changes and modifications may be resorted to without departing from the spirit of the appended claims forming a part hereof.

In the drawing, Fig. 1 is a front elevation of a cabinet embodying the features of advantage hereinabove referred to;

Fig. 2 is a section taken on line 2—2 of Fig. 1;

Fig. 3 is a section taken on line 3—3 of Fig. 1; and

Fig. 4 is an enlarged detail sectional view taken on line 4—4 of Fig. 2.

This application is a division of my copending application, Serial Number 369,897, filed June 10, 1929, which has now matured into Patent No. 1,884,096 granted Oct. 25, 1932, and embodies the use of a casing or cabinet 10 which has an opening 11 located adjacent the lowermost portion of the casing providing an air inlet opening and in addition having an opening 12 located adjacent the upper end of the casing through which air circulating through the casing is discharged into a room to be heated. Grilles 14 and 15 are located at each of the openings 11 and 12 and a cover 16 is located at the upper end of the casing to provide a closure therefor. A humidifier 17 is arranged at this last mentioned end of the casing and in the present embodiment of the invention, the humidifier is in the form of a tank to provide means for the reception of water which, when the tank becomes heated, evaporates and becomes mixed with the air circulating through the casing. The humidifier or tank 17 is formed to provide means for deflecting heated air toward the outlet opening 12 and to this end, is provided with a curved wall 18 which extends from adjacent the rear wall 19 of the casing to adjacent the upper edge of the outlet opening 12. A shutter or damper 20 is employed having the handle 21, the damper being adapted to be moved with respect to the opening 12 and the grille and be held in various positions of adjustment to regulate said opening and thus regulate the amount of heated air escaping from the interior of the casing. In the present instance the shutter or damper is slidable relatively to the opening 12 and the grille 14 and is held against displacement by any suitable means.

A heating unit generally designated 22 is located adjacent the lower grilled opening 15 and is inclined to the vertical and arranged to extend from adjacent the upper edge of the lower opening to the rear wall 19 of the casing to thereby compel air entering the casing to be directed in an inwardly and upwardly direction relatively to the casing. The unit is comprised of header tanks 23 and 24 which are connected with each other through the medium of tubes 25 which are relatively flat in cross section and thus assist in directing the air in an inward and upward direction relatively to the casing.

It is understood that heating fluid inlet and outlet pipes such as 26 and 27 are connected with the respective header tanks 23 and 24 and therefore fluid entering one of the tanks from one or the other of the pipes such as 26 or 27 is caused to circulate into one of the headers through the relatively flat tubes into the opposite header and therefrom through a return pipe such as 26.

The casing 10 is supported by legs or supports 28, 29, 30 and 31 which are located at each corner of the casing and maintain the casing in spaced relation to a floor of the room. However, it is manifest that this last mentioned structure may be eliminated or dispensed with.

The radiator unit 22 includes a plurality of heat radiating fins 32 which are arranged transversely to the tubes 25 and contact with the tubes and thus form means assisting to heat air passing between said fins and tubes.

From the foregoing description of the invention, it is evident that a means is provided for directing air inwardly and upwardly with relation to the casing, the means being located at the inlet opening of the casing and that a humidifier is also provided having means for deflecting heated air toward the outlet opening provided in the casing. It is further evident that a damper is provided for regulating the amount of air escaping from the casing. It may be here stated that the cover 16 is of a type which is removable from the casing to thereby permit the tank or humidifier 17 to be supplied with water when this becomes necessary or desirable.

Having thus described the invention, what I claim as new and desire to cover by Letters Patent is:

1. In a device of the kind described, a cabinet having an upper outlet grille and a lower inlet grille in one wall thereof, a heating unit having tubes elongated in cross section positioned in the cabinet the heating unit and said tubes being inclined to the vertical the heater unit having its upper end adjacent the upper end of said inlet grille and its lower end adjacent the rear wall of the housing opposite the lower end of said inlet grille and said cabinet having means at said upper grille serving also to deflect a current of air outwardly through the upper grille.

2. In a device of the kind described, a cabinet having an upper outlet and a lower inlet opening therein, a heating unit having flat tubes inclined to the vertical providing means for directing air inwardly and upwardly relatively to the interior of said cabinet, said unit being located adjacent the lower opening and humidifying means mounted within said cabinet and serving to deflect a current of air outwardly through the upper opening.

3. In a device of the kind described, a cabinet having an upper outlet and a lower inlet opening therein, a heating unit having flat tubes inclined to the vertical providing means for directing air inwardly and upwardly relatively to the interior of said cabinet, said unit being located adjacent the lower opening and humidifying means mounted within said cabinet.

4. In a device of the kind described, a cabinet having an upper outlet grille and a lower inlet grille in one wall thereof, a heating unit having flat tubes, said heating unit being positioned in the cabinet at an incline to the vertical with its upper end adjacent the upper end of said grille and its lower end adjacent the rear wall of the housing opposite the lower end of said inlet grille and humidifying means mounted within the cabinet, said means serving also to deflect a current of air outwardly through the upper grille.

In witness whereof, I hereunto subscribe my name this 21st day of April A. D., 1931.

ARTHUR B. MODINE.